United States Patent
Delp (10) Patent No.: US 10,067,502 B1
(45) Date of Patent: Sep. 4, 2018

(54) SERVICE DRONE CONFIGURATION BASED ON A SERVICEABLE VEHICLE-COMPONENT FAULT CONDITION

(71) Applicant: Toyota Research Institute, Inc., Los Altos, CA (US)

(72) Inventor: Michael J. Delp, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/452,272

(22) Filed: Mar. 7, 2017

(51) Int. Cl.
| | |
|---|---|
| *G05D 1/00* | (2006.01) |
| *G07C 5/08* | (2006.01) |
| *G07C 5/00* | (2006.01) |
| *B64C 39/02* | (2006.01) |
| *H04W 4/00* | (2018.01) |
| *H04W 4/80* | (2018.01) |

(52) U.S. Cl.
CPC .......... *G05D 1/0011* (2013.01); *B64C 39/024* (2013.01); *G05D 1/0088* (2013.01); *G07C 5/008* (2013.01); *G07C 5/0808* (2013.01); *H04W 4/008* (2013.01); *H04W 4/80* (2018.02); *B64C 2201/146* (2013.01)

(58) Field of Classification Search
CPC .. G08G 5/0043; G08G 5/0069; G08G 5/0039; B64C 39/024; G05D 1/0011; G05D 1/0027; B64F 5/60; H04W 4/008; G06T 7/001
See application file for complete search history.

(56) References Cited

U.S. PATENT DOCUMENTS

| | | | |
|---|---|---|---|
| 9,373,014 B1 * | 6/2016 | Mehranfar | ............ H04W 4/008 |
| 9,428,270 B1 | 8/2016 | Tofte et al. | |
| 9,471,059 B1 | 10/2016 | Wilkins | |
| 2005/0267632 A1 * | 12/2005 | Waita | ....................... G06T 7/001 700/245 |
| 2015/0274294 A1 | 10/2015 | Dahlstrom | |
| 2015/0370251 A1 * | 12/2015 | Siegel | .................. G05D 1/0027 701/2 |
| 2016/0129999 A1 * | 5/2016 | Mays | .................... B64C 39/024 701/2 |
| 2016/0307449 A1 * | 10/2016 | Gordon | ................ G08G 5/0069 |
| 2016/0309346 A1 | 10/2016 | Priest | |
| 2016/0311532 A1 | 10/2016 | Fleck | |
| 2016/0378895 A1 * | 12/2016 | Gnecco | ..................... B64F 5/60 701/2 |
| 2017/0154536 A1 * | 6/2017 | Kreiner | ................ G08G 5/0043 |
| 2017/0337827 A1 * | 11/2017 | Chambers | ............ G08G 5/0039 |

\* cited by examiner

*Primary Examiner* — Yuri Kan
(74) *Attorney, Agent, or Firm* — Christopher G. Darrow; Darrow Mustafa PC (57) ABSTRACT

A device and method for service drone configuration are disclosed. Vehicle diagnostic data is retrieved and monitored for error data that indicates a serviceable vehicle-component fault condition. When the error data indicates the serviceable vehicle-component fault condition, a drone service protocol is generated based on the error data, where the drone service protocol being operable to instruct a service drone to attend to a source of the serviceable vehicle-component fault condition. The drone service protocol can be transmitted for deploying the service drone.

20 Claims, 6 Drawing Sheets

FIG. 1

FIG. 2
service unit 110

FIG. 3
memory 206

FIG. 4A
top view –
land service drone 400

FIG. 4B
side view –
land service drone 400

FIG. 7

SERVICE DRONE CONFIGURATION BASED ON A SERVICEABLE VEHICLE-COMPONENT FAULT CONDITION

FIELD

The subject matter described herein relates in general to service drone operations for a vehicle having autonomous capability and, more particularly, to service drone protocol according to a serviceable vehicle-component fault condition.

BACKGROUND

Drones are becoming more prevalent and accepted as a viable technology. Drones may include unmanned aircraft or self-driving terrestrial and/or water vehicles. Different configurations may provide different functionality at reasonable expense (as contrasted to a human operated vehicle), such as for surveillance for traffic flows, geography mapping, inspection of structures such as bridges, ship hulls, physical condition of roadways, and service functions, such as painting, cleaning, vacuuming, etc. In an autonomous vehicle context, when sensor components relied upon for autonomous operation encounter a fault condition, the vehicle may not operate autonomously until the fault condition can be addressed. Doing so may require time to locate the source of the fault condition, time to repair or retrieve a replacement component, and time to re-calibrate the replacement component to bring the autonomous vehicle into operation. Desired is a service drone operation for servicing a fault condition of an autonomous vehicle to bring the vehicle back online.

SUMMARY

A device and method for configuring a service drone based on a serviceable vehicle-component fault condition are disclosed.

In one implementation, a method for service drone configuration is disclosed. In the method, vehicle diagnostic data is retrieved and monitored for error data that indicates a serviceable vehicle-component fault condition. When the error data indicates the serviceable vehicle-component fault condition, a drone service protocol is generated based on the error data, where the drone service protocol being operable to instruct a service drone to attend to a source of the serviceable vehicle-component fault condition. The drone service protocol can be transmitted for deploying the service drone.

In another implementation, a service unit to configure a service drone for servicing an autonomous-capable vehicle is disclosed. The service unit includes a wireless communication interface to service communication with a vehicle network, a processor communicably coupled to the wireless communication interface, and memory communicably coupled to the processor. The memory stores a vehicle diagnostic module including instructions that when executed cause the processor to retrieve vehicle diagnostic data via the wireless communication interface, and monitor the vehicle diagnostic data for error data indicating a serviceable vehicle-component fault condition. The memory stores a vehicle service module including instructions that when executed cause the processor to, when the error data indicates the serviceable vehicle-component fault condition, generate from the error data a drone service protocol operable to instruct a service drone to attend to a source of the serviceable vehicle-component fault condition. The memory stores a data transmission module including instructions that when executed cause the processor to transmit, via the wireless network interface, the drone service protocol for deploying the service drone.

BRIEF DESCRIPTION OF THE DRAWINGS

The description makes reference to the accompanying drawings wherein like reference numerals refer to like parts throughout the several views, and wherein.

DETAILED DESCRIPTION

Service drone operations for an autonomous and/or autonomous capable vehicle is described herein. One example method provides for monitoring of vehicle diagnostic data for error data that may indicate a serviceable vehicle-component fault condition. Based on the serviceable vehicle-component fault condition, the method provides for a drone service protocol for deploying a service drone, which may operate to address the serviceable vehicle-component fault condition.

Figure 1:
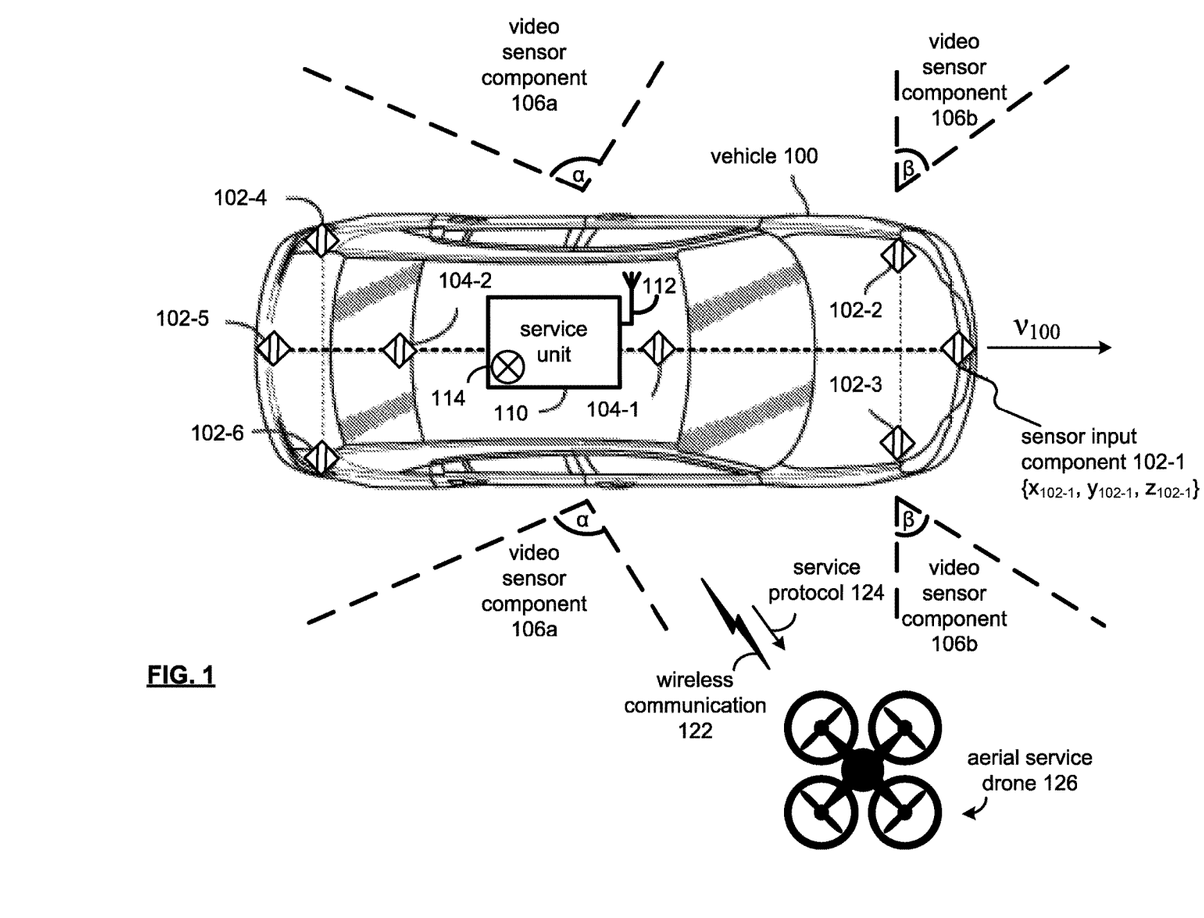
FIG. 1 is a schematic illustration of a vehicle including a service unit.

FIG. 1 is a schematic illustration of a vehicle 100 including a service unit 110. A plurality of sensor components 102, 104 and 106 (having sub-components 106a and 106b) are in communication with the service unit 110.

The service unit 110 may include an antenna 112 communicably coupled to a wireless communications interface to provide wireless communication 122 with the unit 110, which is discussed in detail with reference to FIGS. 2-7.

The sensor components 102, 104 and/or 106 may be positioned on the outer surface of the vehicle 100, or may be positioned in a concealed fashion for aesthetic purposes with regard to the vehicle.

As may be appreciated, one or more of the sensor components 102, 104 and/or 106 may be configured to capture changes in velocity, acceleration, and/or distance to objects observed in the ambient conditions of the vehicle 100, as well as an angle and rate of approach of the vehicle 100 with respect to such objects.

Communication between the sensor components and vehicle control units, including service unit 110, may be on a bus basis, and may also be used or operated by other systems of the vehicle 100. For example, the sensor components 102, 104 and/or 106 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

The sensor components may include sensor input components 102, audible sensor components 104, and video sensor components 106 (such as components 106a and 106b having differing fields-of-view). Outputs of the example sensor components 102, 104, and/or 106 may be monitored by the service unit 110, via vehicle diagnostic data, for error data.

The error data may indicate a serviceable vehicle-component fault condition relating to serviceable vehicle-components such as sensor components 102, 104 and/or 106 that relate to autonomous vehicle operation functions, such as a capability to observe the vehicle environment for functions that may relate to the speed, direction, object avoidance, etc., of the vehicle 100.

The sensor input components 102, by way of example, may provide data relating to tactile or relational changes in the ambient conditions of the vehicle 100, such as an approaching pedestrian, cyclist, object, vehicle, road debris, and other such vehicle obstacles (or potential vehicle obstacles).

The sensor input components 102 may be provided by a Light Detection and Ranging (LIDAR) system, in which the sensor input components 102 may capture data related to laser light returns from physical objects in the environment of the vehicle 100 (such as a point cloud). The sensor input components 102 may also include a combination of lasers (LIDAR) and milliwave radar components.

Audible sensor components 104 may provide data relating to audible sensing of the ambient conditions of the vehicle 100. With speech recognition capability, the audible sensor components 104 may receive instructions to move, or to receive other such directions. The audible sensor components 104 may be provided, for example, by a nano-electromechanical system (NEMS) or micro-electromechanical system (MEMS) audio sensor omnidirectional digital microphone, a sound-triggered digital microphone, etc.

Audible sensor components 104, which may be mounted within an interior and/or an exterior of the vehicle may operate to provide sensor data relating to an approaching person, cyclist, object, vehicle, and other such vehicle obstacles (or potential vehicle obstacles), and such data be conveyed via a sensor control unit to vehicle control unit 110.

Video sensor components 106a and 106b may operate to visually sense the vehicle environment for associated fields of view. For the example of FIG. 1, the video sensor component 106a has a three-dimensional field-of-view of angle-α, and the video sensor component 106b has a three-dimensional field-of-view of angle-β, with each video component having a sensor range for video detection.

In the various driving modes, the examples of the placement of the video sensor components 106a for blind-spot visual sensing (such as for another vehicle adjacent the vehicle 100) relative to the vehicle user, and the video sensor components 106b are positioned for forward periphery visual sensing (such as for objects outside the forward view of a vehicle user, such as a pedestrian, cyclist, vehicle, road debris, etc.). For controlling data input from the sensor components 102, 104 and/or 106, a respective sensitivity and focus of each of the sensor components may be adjusted to limit data acquisition based upon speed, terrain, activity density around the vehicle, etc.

For example, though the field-of-view angles of the video sensor components 106a and 106b may be in a fixed relation to the vehicle 100, the field-of-view angles may be adaptively increased and/or decreased based upon a vehicle driving mode.

The vehicle 100 may also include operational capabilities for operating in manual mode, autonomous mode, and/or driver-assist mode. In the example of the vehicle 100, a service drone configuration with a vehicle including at least driver-assist operational capability.

As may be appreciated, industry and/or governmental standards may define levels of autonomous vehicle operation (that is, manual operation, driver-assist operation, and autonomous operation). For example, SAE International (Society of Automotive Engineers International) defines six levels (L0 to L5) of autonomous vehicle operation. As the level of autonomous operation decreases from the greatest automation at level L5 (full automation) to the least automation at level L0 (no automation), the role of the vehicle operator shifts from a supervisory control priority to that of primary control priority by the vehicle.

Level 1 (driver assistance) and Level 2 (partial automation) automation may be considered variations of driver-assist operational capabilities, while Level 3 (conditional automation), Level 4 (high automation) and Level 5 (full automation) may be considered within autonomous operational capabilities.

When the vehicle 100 is in manual mode, the driver manually controls the vehicle control unit modules, such as a propulsion module, a steering module, a stability control module, a navigation module, an energy module, and any other modules that can control various vehicle functions (such as the vehicle climate functions, entertainment functions, etc.).

In autonomous mode, a computing device, which may be provided by a hardware configuration of the service unit 110, or in combination therewith, can be used to control one or more of the vehicle systems without the vehicle user's direct intervention. Some vehicles may also operate to provide a "driver-assist mode," in which operation of the vehicle 100 can be shared between a vehicle user and a computing device.

For example, in a driver-assist mode, the vehicle user can control certain aspects of the vehicle operation, such as steering, while the computing device can control other aspects of the vehicle operation, such as braking and acceleration. When the vehicle 100 is operating in an autonomous, or driver-assist, mode, the computing device may operate to issue commands based on data produced by the sensor components 102, 104 and/or 106, to the various vehicle control unit modules to direct their operation, rather than such vehicle systems being controlled by the vehicle user.

As shown in FIG. 1, the service unit 110 may be configured to provide wireless communication 122 through the antenna 112, for communication with an aerial service drone 126. The aerial service drone 126 may operate to provide a service action to a serviceable vehicle-component based on a service protocol 124 that may be generated by the service unit 110.

As may be appreciated, other terrain-defined drones may be implemented for servicing vehicles that include at least a driver-assist operational capability. Examples of other service drones may include terrain service drones, aerial service drones, water service drones, or a combination thereof, as well as a mixture of service drone types that may be defined by the terrain to gain access to a vehicle in view of a service drone configuration in view of a drone service protocol.

As one example, a service drone configuration may include water, aerial and/or submersible capabilities to approach and to service a water-based vehicle (such as a recreational boats, commercial water vessels, etc.). A water-based service drone may include an aerial service drone to conduct above water-line servicing, and may also further include a submersible service drone to conduct below water-line servicing.

With the example of FIG. 1, for the aerial service drone 126 may be co-located and deployed by the vehicle 100, may be remotely located, such as with a vehicle service center, and deployed from that location, or may be transported via another service drone for deployment from a location proximal to the vehicle 100

In operation, the plurality of sensor components 102, 104 and/or 106 may operate to provide an autonomous vehicle with the function of "sight." That is, through these components, an autonomous vehicle has the capability to observe its vehicle environment (including, for example, roadways, signage, street lights, other vehicles, pedestrians, etc.), and be capable of autonomously maneuvering in its observed environment.

A serviceable vehicle-component fault condition may involve a vehicle sensor components related to autonomous operation (such as sensor components 102, 104, and/or 106, navigation components, etc.), vehicle sensor components related to vehicle condition monitoring (such as a vehicle speed sensor (VSS) component, an inertial measurement unit (IMU) component, mass airflow sensor component, etc.), as well as components that may affect sensor component operation (such as filters, component lenses, fluids (e.g., oil fluid, brake fluid, antifreeze, etc.).

In the event of a serviceable vehicle-component fault condition that may involve a sensor component, such as one or all of the sensor components 102, 104 and 106, the vehicle 100 may be rendered inoperable (or not capable of safe maneuvering) until the fault condition is corrected. Based on error data relating to the serviceable vehicle-component fault condition, the fault condition may be corrected by a service action provided by the aerial service drone 126, such as a maintenance action, a re-calibration action, a replacement action, etc.

As may be appreciated, a serviceable vehicle-component fault condition may affect autonomous operation of the vehicle 100 in varying service action levels. At a lesser service action level, the fault condition may relate to a maintenance action and/or re-calibration action for a component. At a higher service action level, the fault condition may relate to a capability for the vehicle 100 to operate in an autonomously mode, in which a re-calibration action of a component may suffice, or a replacement action of the component may be required.

A maintenance action may include, for example, cleaning and/or removing foreign objects from a surface and/or sub-components of a sensor component (such as a lens sub-component of input sensor component 102 and/or video sensor component 106, or a screen sub-component of audible sensor component 104). A re-calibration action may include, for example, docking with a vehicle network to re-calibrate a sensor component with active surfaces may experience degraded-sensitivity over time, such as photovoltaic receptor surfaces that may be susceptible to oxidation over time, or electrodes that may erode and/or oxidize over time, etc. A replacement action may include, for example, swapping a serviceable vehicle-component with a replacement vehicle-component. For example, when one of the sensor input components 102 discontinue operation (for example, the useful lifespan of the component ends because of decreased sensitivity that may not be adjustable to operational levels and/or discontinues operation, the component may have been damaged by a foreign object such as road debris, moisture infiltration, crazing of a component surface by sand, dirt, etc.).

As may be appreciated, error data may correspond to (1) a service action specific to a sensor component or sensor component assembly that may operate to reduce an observed ambient/operational conditions to a digital data representation and/or to (2) other separate and distinct vehicle components ancillary to the function of a sensor component and/or sensor component assembly.

For example, a mass airflow (MAF) sensor component may operate to observe an airflow mass flow rate by measuring the air entering a fuel-injected internal combustion engine. Resulting mass airflow data representation may then be used by an engine control unit (ECU), a powertrain control unit (PCU), etc., to balance and deliver a corresponding fuel mass to the engine to improve engine efficiency and operation.

The service unit 110 may operate to retrieve and monitor vehicle diagnostic data for error data that may relate to a MAF sensor component. In this example, the error data may indicate a serviceable vehicle-component fault condition pertaining to the MAF sensor component (such as, the MAF sensor component may be non-responsive or absent). On the other hand, the error data may indicate that the serviceable vehicle-component fault condition pertains to a component in the vehicle airflow path, such as a clogged air filter restricting the engine airflow (such as, the MAF sensor not being able to be satisfied with lower/greater volumes of airflow). A service action may provide for a replacement action for the air filter component, which in turn may remove the related error data from the vehicle diagnostic data.

In operation, when error data indicates a serviceable vehicle-component fault condition, the service unit 110 operates to generate a drone service protocol 124 based on the error data. The drone service protocol 124 may operate to instruct an aerial service drone 126 to attend to a source of the serviceable vehicle-component fault condition. As may be appreciated, the source of the serviceable vehicle component fault condition may be a sensor component (such as a lens surface of a video sensor component), and/or a component related to operation of a sensor component (such as an air filter constricting airflow across a MAF sensor component).

The drone service protocol 124 may include a service drone configuration, such as a service drone type (such as terrestrial, water, air, or a combination thereof), a service drone load capacity (that is, bulk and weight carrying capacity), a service drone docking information (such as physical docking requirements), and service drone communication protocol capability (standard communication protocols, proprietary communication protocols, etc.). Also, the aerial service drone 126 may include autonomous operation, in which location and inertial movement unit devices may be utilized to locate and provide service actions to sources of vehicle-component fault conditions.

The aerial service drone 126 may be co-located with the vehicle 100 (such as in a vehicle storage location, or received by a docking station of the vehicle 100 to sustain an operational power charge, as well as to communicably couple with a vehicle network on a wireless basis, a wireline basis, and/or a combination thereof for receiving a service protocol 124.

The aerial service drone 126 may receive the service protocol 124 via a wireless communication 122. In this manner, the service drone 126 may be remote relative to the vehicle 126, such as co-located with a vehicle service facility having access to component inventories for servicing the vehicle 100.

Sensor components positioned with the vehicle 100 may include vehicle-component identifier data, and vehicle-component location data. Vehicle-component identifier data may include a vehicle network address specific to the component, as well as further information identifiers that may be retrieved via a lookup table or other informational database, and provided with the service protocol 124.

The vehicle-component location data may include location data (such as via a directional markers related to a vehicle reference point 114), visual data marker identifier data, near field communication identifier data, etc.

Location data may be based on relative position to a vehicle reference point 114 having location data of $\{X_{114}, Y_{114}, Z_{114}\}$. The vehicle reference point 114 may be coincident with a placement location of the service unit 110, or as may be appreciated, coincident with a sensor component location, or may be located elsewhere with the vehicle 100 as desired.

Each of the sensor components has a relative location to the vehicle reference point 114, which may be defined in vehicle schematics, CAD files, etc., and accessible via a memory of the service unit 110, and retrieved from a lookup table of the service unit 110 based on a vehicle network address for a source of the serviceable-vehicle-component fault condition (that is, for the example of a MAF sensor component, the component's vehicle network address may provide location data for the MAF sensor component relative to the reference 114, and location data related serviceable-components, such as an air filter component that by its basic nature may not have network functionality or a network address).

For example, each of the sensor input components 102-1 through 102-6 may have associated location data relative to the vehicle reference point 114, such as $\{X_{102-1}, Y_{102-1}, Z_{102-1}\}$, etc. Aerial service drone 126 may locate sensor components based on an internal location data reference relative to the reference point 114.

Location data may be presented as visual marker identifier data positioned on or adjacent to the component, or unique address for that component (provided with the service protocol 124) that may be visually scanned and read by the aerial service drone 126. For example, visual marker identifier data for visual detection may be presented as QR (Quick Response) tag data, APRIL (Autonomy, Perception, Robotics, Interfaces, and Learning) tag data, etc. Similarly, near field communication (NFC) data may be provide with the service protocol 124, such as RFID data that may be scanned by a RFID (Radio Frequency ID) strip positioned on or adjacent a source of the vehicle-component fault condition.

Figure 2:
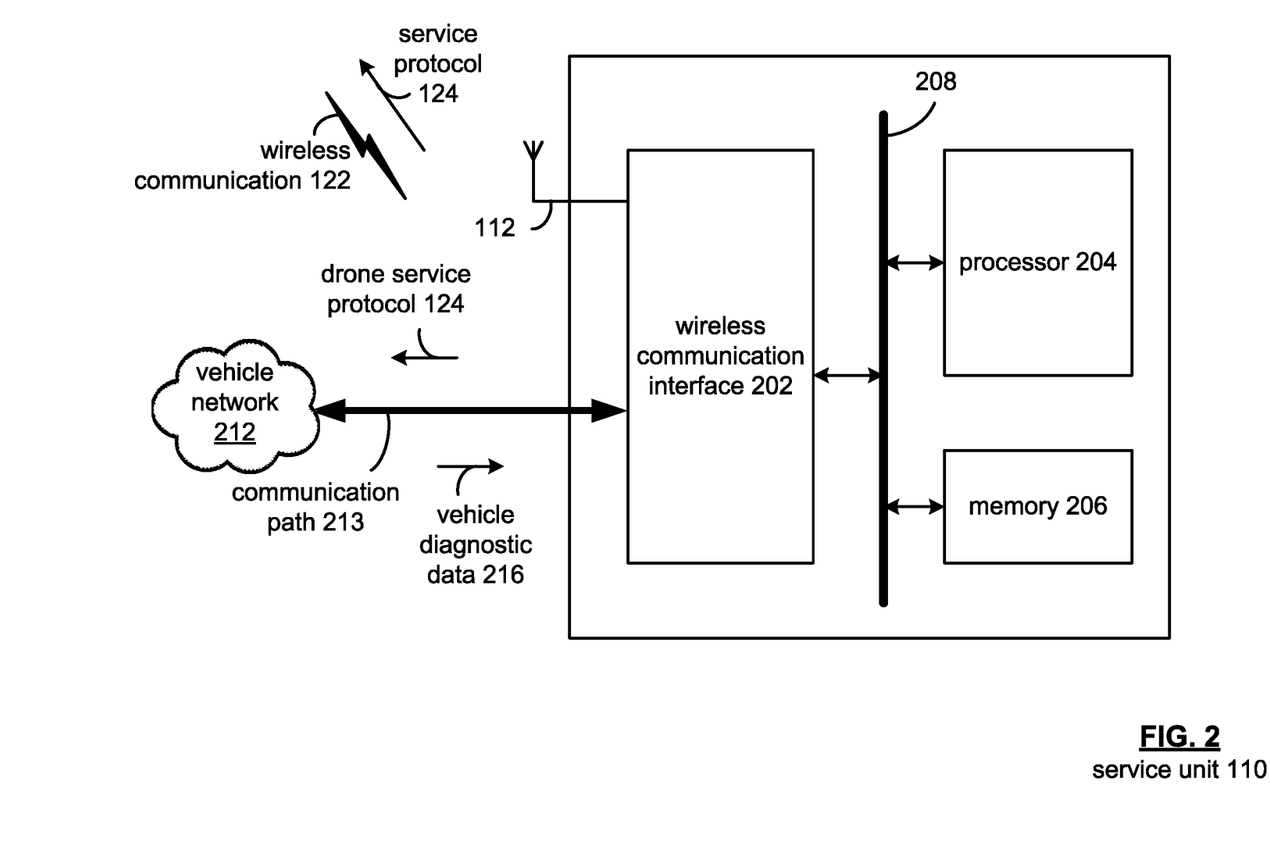
FIG. 2 is a block diagram of the service unit of FIG. 1.

FIG. 2 is a block diagram of a service unit 110, which includes a wireless communication interface 202, a processor 204, and memory 206, that are communicably coupled via a bus 208. The service unit 110 may provide an example platform for the device and methods described in detail with reference to FIGS. 1-7.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules, at least some of which are described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processing module 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 804. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions corresponding to at least some of the steps and/or functions illustrated in FIGS. 1-7.

The service unit 110 can include one or more modules, at least some of which are described herein. The modules can be implemented as computer-readable program code that, when executed by a processor 204, implement one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communications interface 202 generally governs and manages the data received via a vehicle network 212 and/or the wireless communication 122. There is no restriction on the present disclosure operating on any particular hardware arrangement and therefore the basic features herein may be substituted, removed, added to, or otherwise modified for improved hardware and/or firmware arrangements as they may develop.

The antenna 112, with the wireless communications interface 202, operates to provide wireless communications with the service unit 110, including wireless communication 122.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 can comprise a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100. The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The service unit 110 may be operable to retrieve vehicle diagnostic data 216 via the wireless communication interface 202, and monitor the vehicle diagnostic data 216 for error data indicating a serviceable vehicle-component fault condition. Aspects relating to error data and serviceable vehicle-component fault conditions are discussed in detail with reference to FIGS. 3-7.

The service unit 110 may operate, when error data indicates a serviceable vehicle-component fault condition, to generate a drone service protocol 124 operable to instruct an aerial service drone 126 (FIG. 1) to attend to a source of the serviceable vehicle-component fault condition. The drone service protocol 124 operates to identify a serviceable vehicle-component and a service action.

The wireless communication interface 202 of the service unit 110 may operate to transmit the drone service protocol 124 via the wireless communication 122 for deploying the service drone. As may be appreciated, the wireless communication interface 202 of the service unit 110 may also operate to transmit the drone service protocol 124 via a communication path 213 for distribution via a vehicle network 212 to an aerial service drone 126 (FIG. 1).

Figure 3:
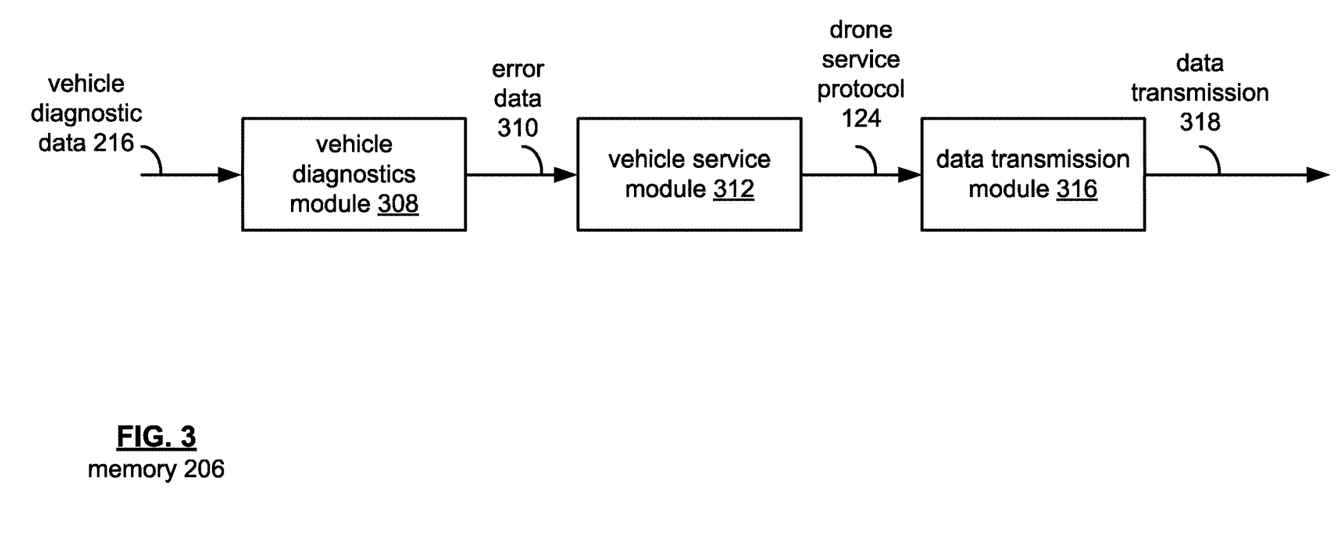
FIG. 3 is a functional module block diagram of the service unit of FIG. 1.

FIG. 3 illustrates a functional module block diagram for a service unit 110, where memory 206 stores a vehicle diagnostics module 308, a vehicle service module 312, and a data transmission module 316.

The vehicle diagnostics module 308 includes instructions that when executed cause the processor 204 to retrieve vehicle diagnostic data 216. The vehicle diagnostics module 308 may monitor the vehicle diagnostic data 216 for error data 310 indicating a serviceable vehicle-component fault condition.

Generally, vehicles include on board diagnostics (OBD) processes, routines, algorithms, etc., that may permit the vehicle diagnostics module 308 to access vehicle diagnostic data 216 for various vehicle subsystems. The service unit 110 may continuously or periodically monitor the vehicle diagnostic data 216 by correspondingly accessing a vehicle's OBD functionality to retrieve the vehicle diagnostic data 216. In this manner, the vehicle diagnostics module 308 may monitor the vehicle diagnostic data 216 on a real-time, or near real-time, basis. For example, the vehicle diagnostics module 308 may retrieve and/or monitor vehicle diagnostic data 216 using on-board diagnostics Parameter IDs to monitor current component data, retrieve fault values 404 (such as diagnostic trouble codes), etc.

As may be appreciated, the vehicle diagnostics module 308 may access OBD functions via a vehicle network 212 and/or bus 208. When the service unit 110 may be a remote device (that is, not co-located with the vehicle), the vehicle diagnostics module 308 may retrieve vehicle diagnostics data 216 via a wireless communication link 122 (FIG. 1). Also, other vehicle units may operate to update memory locations of the service unit memory 206 for retrieval by the vehicle diagnostics module 308.

When the vehicle diagnostic data 216 may present a serviceable vehicle-component fault condition, the error data 310 may include a fault value, which the vehicle service module 312 may base a service action by a service drone.

When error data 310 is detected, the vehicle diagnostics module 308 may operate to provide the error data 310 to the vehicle service module 312. The error data 310 is discussed in detail with reference to FIG. 5.

The vehicle service module 312 generally includes instructions that when executed may cause the processor 204 (FIG. 2) to generate a drone service protocol 124 based on error data 310. The drone service protocol 124 may include data identifying a serviceable vehicle-component (such as a sensor input component 102, vehicle air filter, etc.) and/or a component of the serviceable vehicle-component (such as an optics-based lens cover, a protective component shield, a calibration interface, etc.).

The service action component of the service drone protocol 124 operates the service action responsive to a fault value of the error data 310. The drone service protocol 124 may operate to instruct a service drone to attend to the source of the serviceable vehicle-component fault condition being identifiable via the error data 310. Also, a done configuration may be provided by the service action for a size, shape, travel, and communications capability of a selectable service drone, which is discussed in detail with reference to FIG. 5.

The data transmission module 316 generally includes instructions that when executed may cause the processor 204 (FIG. 2) to receive the drone service protocol 124, and to produce a data transmission 318 for delivery to a service drone, or service drone base station. In producing the data transmission 318, the data transmission module 316 may format the drone service protocol 124 for the respective transmission medium.

Figure 4A:
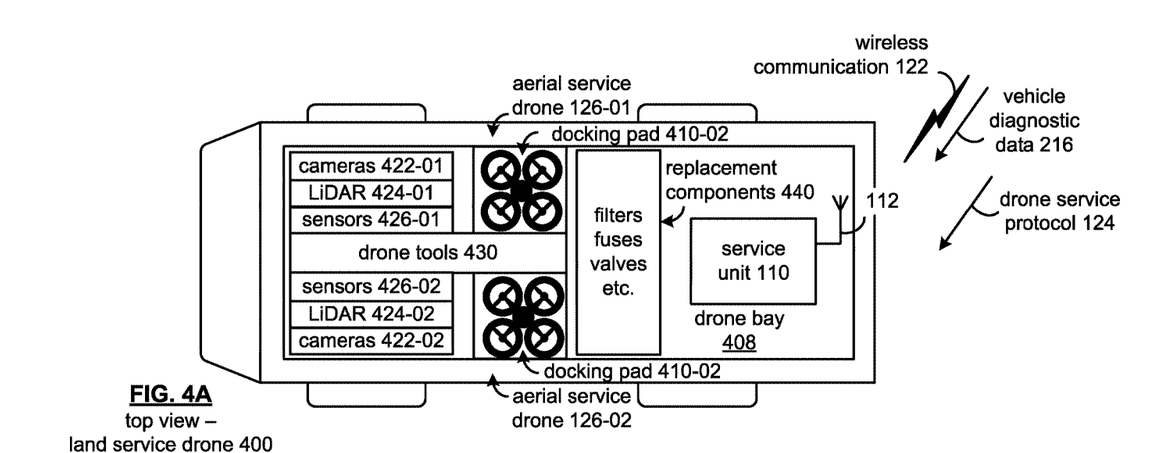
FIGS. 4A and 4B illustrate a side view and a top view of an example land-based service drone including aerial service drones for deployment.
Figure 4B:
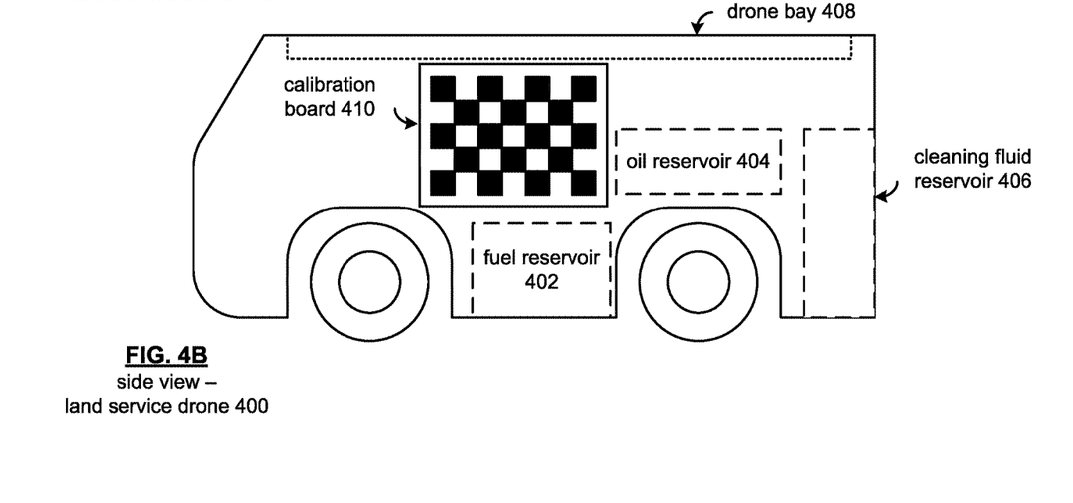

FIGS. 4A and 4B illustrate a top view and a corresponding side view of an example land service drone 400 that may include aerial service drones 126-01 and 126-02 received by respective docking pads 410-01 and/or 410-02. As may be appreciated, a service drone configuration may be based on a drone service protocol, as is discussed in detail with respect to FIGS. 5-7.

The docking pads 410-01 may be configured to provide an interface for communication between the service unit 110 and the respective drone 126-01 and/or 126-02, as well as providing a power and/or fuel replenishment source for the respective drone 126-01 and/or 126-02.

Also, as may be further appreciated, aerial service drones 126-01 and 126-02 may be similarly configured to perform similar service actions, or may be configured differently to specialize with respect to different categories of service actions (such as a service action for sensor replacement, filter replacement, maintenance/cleaning, fluid replacement, etc.). As also may be appreciated, additional service drones may be included with the land service drone 400, each capable of being deployed for similar and/or different service actions.

The example of FIGS. 4A and 4B illustrate a service drone configuration with a vehicle including at least driver-assist operational capability. As may be appreciated, the land service drone 400 may operate to extend a servicing distance range for a vehicle (such as vehicle 100 of FIG. 1) by aerial service drones 126-01 and 126-02.

Referring to FIG. 4A, the land service drone 400 may include a drone bay 408 that may be configured to provide components, tools, and servicing products (for example, engine oil, vehicle fuel, cleaning fluids, etc.) to a servicing drone deployed to service the vehicle 100. The drone bay 408 may be an open air surface to receive drone servicing components to protect from air turbulence while the land service drone 400 travels, and a cover surface to protect the components from the weather.

The land service drone 400 may include components accessible respectively by each of the aerial service drones 126-01 and 126-02. For example, aerial service drone 126-01 may access vehicle replacement components such as cameras 422-01, LiDAR components 242-01, sensors 426-01, etc. Aerial service drone 126-02 may access vehicle components such as cameras 422-02, LiDAR components 242-02, sensors 426-02, etc.

The land service drone 400 may also include components respectively available to each of the aerial service drones 126-01 and 126-02, such as drone tools 430, which are tools to be adaptively received by either of the aerial service drones 126-01 and/or 126-02 (e.g., rotary sander adapted tool, nozzle sprayer, cloth wheel, canned air, etc.). Each of the drone tools 430 may be adaptable to either of the aerial service drone 126-01 and 126-02, or each of the aerial service drones 126-01 and 126-02 may be configured differently to adaptively couple with different drone tools to be deployed to perform different service actions with respect to each other.

The land service drone 400 may also include components respectively available to each of the aerial service drones 126-01 and 126-02, such as replacement components 440 (such as air filters, system fuses, valves, other sensor components, etc.), that may be categorized on a grid system for retrieval by either of the aerial service drones 126-01 and 126-02.

The land service drone 400 may include a service unit 110 that may operate to form a wireless communication 122, via antenna 112, to retrieve vehicle diagnostic data 216 via an interface, and to generate a drone service protocol based on error data for generating a drone service protocol as relating to aerial service drone 126-01 and/or 126-02.

As may be appreciated, the land service drone 400 may also receive via the wireless communication 122 a drone service protocol 124 operable to identify a serviceable vehicle component and a service action for a vehicle 100 (FIG. 1), and to deploy the land service drone 400, the aerial service drone 126-01, the aerial service drone 126-02, or a combination thereof.

Referring to FIG. 4B, the side view of the land service drone 400 illustrates other components relating to a service action for a serviceable vehicle component. The land service drone 400 may include vehicle fluids relating to service actions. For example, the land service drone 400 may include a fuel reservoir 402 for a low fuel service action, an oil reservoir 404 for a low oil service action, a cleaning fluid reservoir 406 for use by an aerial service drone 126-01 and/or 126-02 for cleaning an optic surface of a vehicle sensor component 102 (FIG. 1) such as a camera sensor component, a video sensor, a LiDAR component, etc.

The aerial service drone 126-01 and/or 126-02 may access fluids of the reservoirs 402, 404, and/or 406 via tap or channel access to a drone pad operating to receive the drone 126-01 and/or 126-02. The drone pad may separate from a docking pad 410-01 and/or 410-02, or may provided in combination with a docking pad 410-01 and/or 410-02.

Also, the land service drone 400 may include additional calibration tools that may not be capable of transport with an aerial service drone 126-01 and/or 126-02. For example, the land service drone 400 may include a calibration board 410 on an exterior surface (such as provided as signage, a display (such as an LED display). A calibration board 410 may be provided for a re-calibration service action for an existing sensor component and/or replaced sensor component (such as a video sensor component, a camera sensor component, a LiDAR component, etc.). As may be appreciated, when the calibration board 410 is provided as an LED display, other images may be implemented for other service actions. Also, the drone service protocol 124, when including a re-calibration service action, may indicate the location for placement of the land service drone 400 for use of the calibration board 410.

As discussed, the drone service protocol 124 may be provided to the land service drone 400, or may be based on retrieval and monitoring of vehicle diagnostic data 216 for error data that indicates a serviceable vehicle-component fault condition, as is discussed in detail with reference to FIGS. 5-7.

Figure 5:
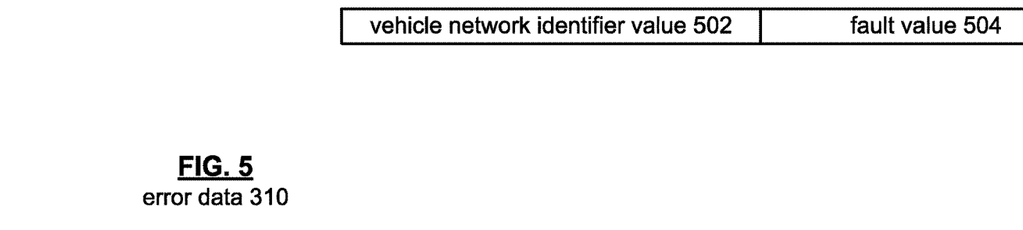
FIG. 5 illustrates a frame format of error data relating to a serviceable vehicle-component fault condition.

FIG. 5 illustrates an example frame format for error data 310. As may be appreciated, the error data 310 may include a vehicle network identifier value 502 and a fault value 504. As may be appreciated, further and/or different formats may be implemented based on various protocols, as a well as encapsulation, transcoding, etc., of a frame for transmission and/or reception of the data via various networks.

For service drone operations, the vehicle network identifier value 502 may operate to specify the source of a serviceable vehicle-component fault condition set out by the fault value 504.

The vehicle network identifier value 502 may be used to specify location data for a service drone 400 and/or 126 relative to a reference point 114 of the vehicle 100 (FIG. 1). Various vehicle network identifier values 502 may be implemented using network addressing formats associated with a networking communications protocol. An example may include Physical and Data Link Layer addressing, in which network components (or nodes) in general may be identified, and generally may be provided in data frames for the vehicle diagnostic data 216. As may be appreciated, IP-type addresses may be used for vehicle network identifier data 502, as well as proprietary addressing formats that may be implemented by vehicle manufacturers.

Accordingly, the vehicle network identifier value 502 may operate to uniquely identify a component in relation to a plurality of components that may be in communication via a vehicle network 212 (FIG. 2). The vehicle network identifier value 502 may operate to identify, for example, object detection components (for example, video sensor components, radar/LIDAR sensor components), location sensor components (for example, location and inertial measurement unit component, GPS location component, cellular location components, etc.), user-interface components (such as a touch screen, buttons, toggle switches, dials), engine performance components (such as an air filter, serviceable injector components, operated by a vehicle user (when present), for a source of a serviceable vehicle-component fault condition.

Fault value 504 may operate to relate the nature of a fault condition. Generally, the fault value 504 may function to indicate an operational state of a plurality of operational states for the source of the serviceable vehicle component fault condition.

On board diagnostics systems generally may operate in accordance standards specifications that may define diagnostic trouble codes (DTCs), which may defined in accordance with one or more standards bodies including, but not limited to, SAE (Society of Automotive Engineers) International, Institution of Mechanical Engineers-Automobile Division (IMechE), etc. As may be appreciated, diagnostic trouble codes may be updated and/or added by standards associations in view of advances in vehicle system technologies.

For service drone applications, a vehicle network identifier value 402 may provide vehicle-component location data that the service drone may utilize to locate the source of a serviceable vehicle-component fault condition, as is discussed in detail with reference to FIG. 6.

As an example for a MAF (mass airflow) sensor component, diagnostic trouble codes may include "0100" to indicate a malfunction (or a first operational state for a replacement service action), "0101" to indicate a range/performance problem (or a second operational state for a re-calibration service action), "0102" to indicate low input (or a third operational state for a maintenance service action), etc.

Figure 6:
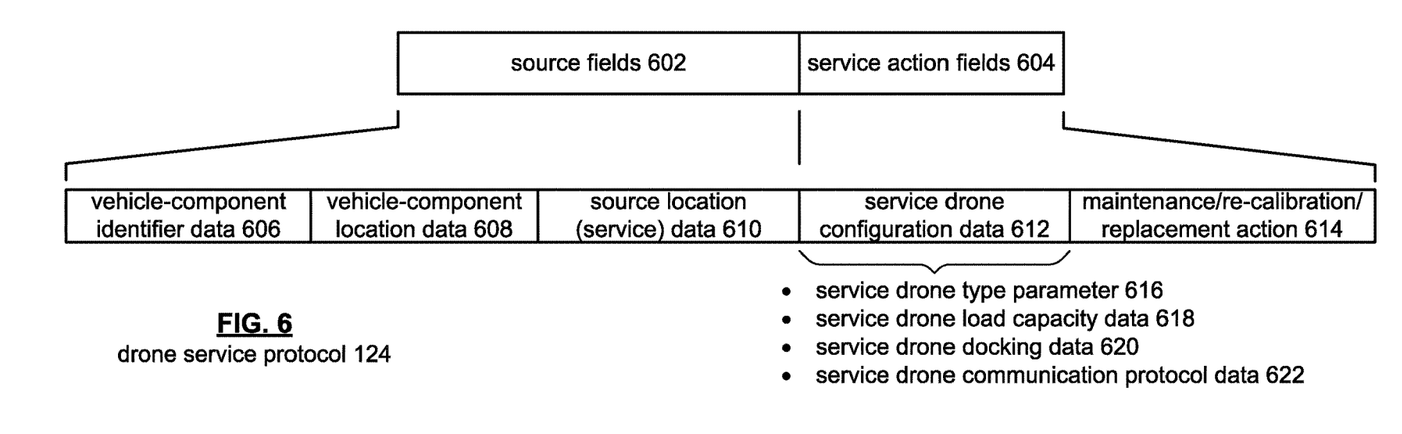
FIG. 6 illustrates a frame format of a drone service protocol.

FIG. 6 illustrates an example frame format of a drone service protocol 124. As may be appreciated, various preambles, headers, post-ambles may be implemented based on various wireless and/or wireline communication protocols, including encapsulation, transcoding, etc., of the protocol 124 that may be implemented with respect to a service drone and a service unit 110 for transmission and/or reception of the protocol 124 via various networks.

The drone service protocol 124 may be used to identify source fields 602 of a serviceable vehicle component and a service action fields 604, based on the error data 310 (FIG. 3).

The source fields 602 may include vehicle-component identifier data 606, vehicle component location data 608, and source location (service) data 610.

As may be appreciated, the vehicle network identifier value 502 may be used as a primary key to access, or an identifier, for a record or a group of records of a data file relating to vehicle components. Accordingly, with a plurality of vehicle network identifier values 502, the related identifiers may be maintained in a key table and indexed to speed data record retrieval related to a service action for an identified service action based on a service action fields 604 as relayed via a replacement action 614. As may be appreciated, the tables may be provided in a key table form, an index file form in which index values and pointers to records and/or rows that are stored sequentially, a B-tree form in which entries may be placed to allow a database to more rapidly access an index entry without searching the entire tree, a hashtag form, a inverted list form, etc.

Fault value 504 may serve in combination with the primary key of the vehicle network identifier value 502 to form a composite key to access service drone configuration data 612 responsive to the service action fields 604.

For the example of a MAF sensor component, the vehicle network identifier value 502 may operate to identify related components, such as the MAF sensor component itself, an air filter component, etc. When the fault value 504 may indicate a "0100" for a malfunction, a composite key formed with the vehicle network identifier value 502 may set the vehicle-component identifier data 606 to indicate a MAF sensor component. For another example, when the fault value 504 may indicate a "0102" for a low input (because of a low airflow density perhaps due to a dirty air filter), a composite key formed with the vehicle network identifier value 502 may the vehicle-component identifier data 506 may be set to indicate an "air filter."

In kind, further fields of the drone service protocol 124 may be populated per the example of a composite key. In this regard, the vehicle-component location data 508 may operate to indicate the physical location of the component identified by the vehicle-component identifier data 606, such as by location data (for example, coordinates $X_{102\text{-}1}$, $Y_{102\text{-}1}$, $Z_{102\text{-}1}$ for sensor input component 102-1) relative to a vehicle reference point 114 (FIG. 1), visual marker identifier data, near field communication (NFC) identifier data, etc., that are operable to be scanned by a service drone for a location determination for the vehicle=component identifier data 606.

Examples of visual marker identifier data may relate to scannable data codes, such as those relating to APRIL (Autonomy, Perception, Robotics, Interfaces, and Learning) tag data, to QR (Quick Response) code data, bar code data, etc. NFC identifier data may relate to wireless scanning of tag data. Visual marker identification data and/or NFC identifier data may be placed adjacent and/or on vehicle components to allow a service drone to visually and/or wirelessly scan tag data to locate a vehicle component of the vehicle-component identifier data 606.

Source location (service) data 610 may relate to location data for the replacement component (e.g., sensor component, air filter, etc.), materials (e.g., cleaners, abrasion pads, etc.), and/or tools adapted to be received by the service drone (e.g., rotary sander adapted tool, nozzle sprayer, cloth wheel, canned air, etc.) to perform a service action of field 604. For example, a service building location may indicate in an inventory system a column, shelf, and bin for retrieval of the item. In the example in which a service drone may be co-located with a vehicle 100, the source location (service) data 610 may indicate the vehicle compartment (glove box, rear hatch, engine space, etc.), and coordinates for the component, whether replacement, re-calibration, maintenance, etc.

A composite key of the service action fields 604 with the fault value 404 (FIG. 4) may provide an index to service drone configuration data 612, and maintenance/re-calibration/replacement action 614.

The service drone configuration data 612 may include configuration parameter data, such as service drone type parameter 616, service drone load capacity parameter 618, service drone docking data 620, service drone communication protocol data 622, etc.

As may be appreciated, a service drone that may be co-located with the vehicle may be configurable relative to the maintenance/re-calibrations/replacement action 614, with respect to travel (air, terrestrial and/or water), a load capacity (that is, the weight and/or bulk of the applicable tool and/or item). Also, the service drone may have the capability to serve as the replacement item based on docking capability with the vehicle, and ability to communicate with the vehicle via a communication protocol For example, when a service action fields 604 may be for a replacement for a sensor component 102, 104 or 106, a service drone may be configured to incorporate the respective sensor component. When so configured, the service drone docking data 620 may indicate a docking location and method (for example, magnetic, latch, keyed, etc.) for a fixed relation to the vehicle, and based on a wireless and/or wireline communicably coupling with the vehicle network for communication via the service drone communication protocol data 622. In this manner, the service drone itself may temporarily compensate and/or replace a malfunctioning sensor component frustrating autonomous operation of the vehicle.

Figure 7:
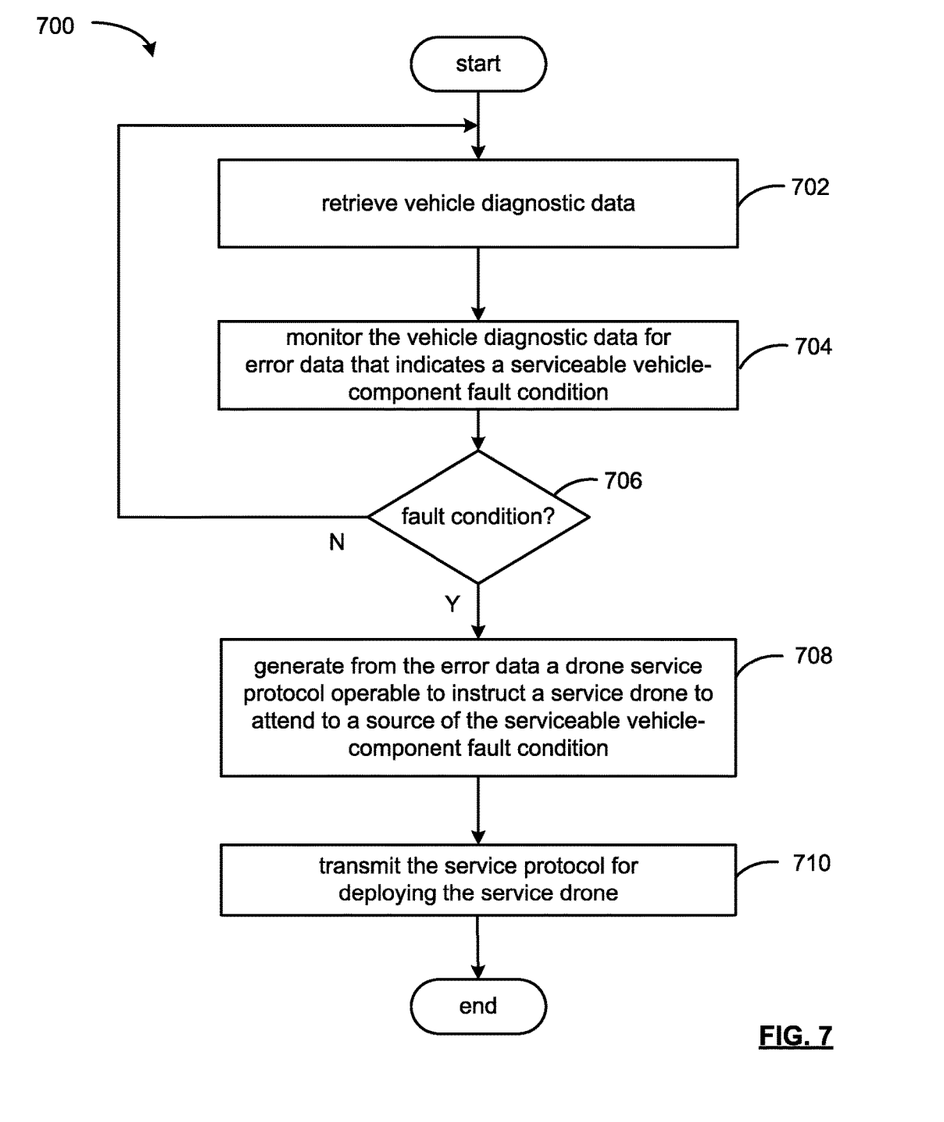
FIG. 7 shows an example process for service drone configuration with an autonomous vehicle based on a serviceable vehicle-component fault condition.

FIG. 7 shows an example process 700 for service drone configuration with an autonomous vehicle based on a serviceable vehicle-component fault condition.

At operation 702, vehicle diagnostic data may be retrieved. Vehicle diagnostic data may be on a sensor-component by sensor-component basis, on a reporting basis, etc. Also, vehicle diagnostic data may be based on proprietary bases, on standardized bases, and/or a combination thereof. As may be appreciated, diagnostic trouble codes may be updated and/or added by standards associations in view of advances in vehicle system technologies.

At operation 704, the vehicle diagnostic data may be monitored for error data that indicates a serviceable vehicle-component fault condition. In this manner, a serviceable vehicle-component fault condition may be considered to be one in which a service action may be applied to alleviate the fault condition. Service actions may include maintenance, re-calibration, replacement, etc.

When at operation 706 the error data does not indicate a serviceable vehicle-component fault condition, the process 700 may continue retrieving vehicle diagnostic data at 704 and monitoring error data for a serviceable vehicle-component fault condition at operation 704.

When a serviceable vehicle-component fault condition may be indicated by the error data, where the drone service protocol being operable to instruct a service drone to attend to a source of the serviceable vehicle-component fault condition, the drone service protocol identifying a serviceable vehicle-component and a service action.

The drone service protocol, as described in detail above with reference to FIGS. 5 and 6, may operate to instruct a service drone to attend to a source of the serviceable vehicle-component fault condition. As may be appreciated, the source of the serviceable vehicle component fault condition may be a sensor component (such as a lens surface of a video sensor component), a component related to, associated with, and/or ancillary to an operation of a sensor component (such as an air filter constricting airflow across a MAF sensor component).

The service drone protocol 124 may include a service drone configuration, such as a service drone type (such as terrestrial, water, air, or a combination thereof), a service drone load capacity (that is, bulk and weight carrying capacity), a service drone docking information (such as physical docking requirements), and service drone communication protocol capability (standard communication protocols, proprietary communication protocols, etc.).

The drone service protocol, at operation 710, may then be transmitted for deploying a service drone. For example, the drone service protocol may be transmitted wirelessly via cellular data networks when a service drone may be docked remotely from the vehicle 100 (such as at a service shop, parts/supplies facility, etc.), may be transmitted wirelessly via a short range communication, such as WiFi and/or WLAN communications, mesh communications, Bluetooth communications, etc., when a service drone is docked locally to the vehicle 100 (such as a compartment, external vehicle bay, etc.), or via a communicable coupling via docking mechanisms to couple with the vehicle network (such as a BEAN, CAN, LAN, etc.).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for servicing a vehicle including at least driver-assist operational capability using a service drone protocol, the method comprising:
    retrieving vehicle diagnostic data of the vehicle using an interface;
    in response to detecting that the diagnostic data indicates a fault condition, generating a drone service protocol that is a communication to instruct a service drone to attend to the fault condition associated with the vehicle, the drone service protocol identifying a serviceable vehicle-component that is experiencing the fault condition and a service action to remedy the fault condition; and
    transmitting the drone service protocol to the service drone to cause the service drone to deploy to the vehicle and perform the service action.

2. The method of claim 1, wherein monitoring for the fault condition includes identifying error data within the vehicle diagnostics data corresponding to the fault condition that is of at least a defined service action level that indicates the fault condition is affecting an ability of the vehicle to operate autonomously,
    wherein the error data comprising:
    a vehicle network identifier value for identifying a source of the fault condition; and
    a fault value for identifying the fault condition.

3. The method of claim 1, wherein the drone service protocol further comprising:
    vehicle-component identifier data based, at least in part, on vehicle network identifier value for identifying a source of the fault condition;
    vehicle-component location data based, at least in part, on the vehicle network identifier value;
    source location data for a replacement vehicle-component based, at least in part, on the vehicle-component identifier data; and
    service drone configuration data for the service action.

4. The method of claim 3, wherein the vehicle-component location data comprising at least one of:
    location data relative to a vehicle reference point;
    visual marker identifier data; and
    near field communication (NFC) identifier data.

5. The method of claim 3, wherein the service drone configuration data further comprising:
    service drone type data;
    service drone load capacity data;
    service drone docking data; and
    service drone communication protocol data.

6. The method of claim 2, wherein the fault value indicates an operational state of a plurality of operational states for the serviceable vehicle component that is the source of the fault condition.

7. The method of claim 6, wherein the service action comprises at least one of:
    a replacement service action for a first operational state of the plurality of operational states, wherein the replacement service action includes swapping the serviceable-vehicle component for a replacement component;
    a re-calibration service action for a second operational state of the plurality of operational states, wherein the re-calibration service action includes re-calibrating the serviceable-vehicle component; and
    a maintenance service action for a third operational state of the plurality of operational states, wherein the maintenance service action includes cleaning the serviceable-vehicle component.

8. The method of claim 1, the serviceable vehicle component that is a source of the fault condition comprising at least one of:
    a video sensor component;
    a sensor input component;
    an audible sensor component;
    a location and inertial measurement unit (IMU) component; and
    a mass airflow (MAF) sensor component.

9. A method for servicing a vehicle having an autonomous operational capability using a service drone protocol comprising:
    retrieving vehicle diagnostic data about the vehicle via a vehicle network interface; and
    in response to identifying that the vehicle diagnostic data indicates a source component of the vehicle is experiencing a fault condition, generating the service drone protocol that identifies at least the fault condition and a service action to remedy the fault condition, and transmitting the service drone protocol to a service drone to cause the service drone to deploy to the vehicle and perform the service action.

10. The method of claim 9, further comprising:
monitoring for the fault condition by identifying error data from within the vehicle diagnostic data corresponding to the fault condition that is of at least a defined service action level that indicates the fault condition is affecting an ability of the vehicle to operate autonomously,
wherein the error data comprising:
a vehicle network identifier value for identifying the source component and a source location relative to the vehicle; and
a fault value for identifying an operational state for the source component.

11. The method of claim 9, wherein generating the service drone protocol further comprising generating the service drone protocol to include:
replacement location data for a source component replacement;
source location data for the source component relative to the vehicle; and
service drone configuration data based on a service action of the service request.

12. The method of claim 11, wherein the source location data comprising at least one of:
visual data marker identifier data; and
near field communication (NFC) identifier data.

13. The method of claim 11, wherein the service drone configuration data further comprising:
service drone type data;
service drone load capacity data;
service drone docking data; and
service drone communication protocol data.

14. The method of claim 11, wherein the service action comprising at least one of:
a replacement service action for source component, wherein the replacement service action includes swapping the source component for a replacement component;
a re-calibration service action for the source component, wherein the re-calibration service action includes re-calibrating the source component; and
a maintenance service action for the source component, wherein the maintenance service action includes cleaning the source component.

15. The method of claim 9, the source component comprising at least one of:
a video sensor component;
a sensor input component;
an audible sensor component;
a location and inertial measurement unit (IMU) component; and
a mass airflow (MAF) sensor component.

16. A service unit for deploying a service drone to service a vehicle according to a service drone protocol, the service unit comprising:
a wireless communication interface;
a processor communicably coupled to the wireless communication interface;
memory communicably coupled to the processor and storing:
a vehicle diagnostic module including instructions that when executed cause the processor to:
retrieve vehicle diagnostic data via the wireless communication interface; and
a vehicle service module including instructions that when executed cause the processor to, in response to detecting a fault condition within the vehicle diagnostic data, generate a drone service protocol that is a communication to instruct a service drone to attend to a source component within the vehicle that is experiencing the fault condition, the drone service protocol identifying the source component of the vehicle and a service action to remedy the fault condition; and
a data transmission module including instructions that when executed cause the processor to transmit, via the wireless network interface, the drone service protocol to cause the service drone to deploy to the vehicle and perform the service action.

17. The service unit of claim 16, wherein the vehicle diagnostic module including instructions to monitor for the fault condition by identifying error data within the vehicle diagnostics data corresponding to the fault condition that is of at least a defined service action level that indicates the fault condition is affecting an ability of the vehicle to operate autonomously,
wherein the error data comprises:
a vehicle network identifier value for identifying the source component that is causing the fault condition; and
a fault value for indicating an operational state of a plurality of operational states for the source component.

18. The service unit of claim 17, wherein the service action comprises at least one of:
a replacement service action for a first operational state of the plurality of operational states, wherein the replacement service action includes swapping the source component for a replacement component;
a re-calibration service action for a second operational state of the plurality of operational states, wherein the re-calibration service action includes re-calibrating the source component; and
a maintenance service action for a third operational state of the plurality of operational states, wherein the maintenance service action includes cleaning the source component.

19. The service unit of claim 17, wherein the drone service protocol further comprising:
vehicle-component identifier data based, at least in part, on a vehicle network address;
vehicle-component location data based on the vehicle network address;
source location data for a replacement vehicle-component based on the vehicle-component identifier data; and
service drone configuration data for the service action.

20. The service unit of claim 19, wherein the service drone configuration data further comprising:
service drone type data;
service drone load capacity data;
service drone docking data; and
service drone communication protocol data.

* * * * *

UNITED STATES PATENT AND TRADEMARK OFFICE
CERTIFICATE OF CORRECTION

PATENT NO. : 10,067,502 B1
APPLICATION NO. : 15/452272
DATED : September 4, 2018
INVENTOR(S) : Michael J. Delp It is certified that error appears in the above-identified patent and that said Letters Patent is hereby corrected as shown below:

In the Specification

Column 1, Line 20:
Delete "surveillance for traffic" and add "surveillance, traffic"

Column 4, Line 8:
Insert --is provided-- between "capability" and "."

Column 5, Line 50:
Delete "autonomously" and add "autonomous"

Column 7, Line 52:
Delete "provide" and add "provided"

Column 9, Line 1:
Delete "located"

Column 11, Line 25:
Delete "done" and add "drone"

Column 14, Line 41:
Delete "fields" and add "field"

Column 18, Line 3:
Insert --and-- after "autonomously,"

In the Claims

Column 18, Line 11 Claim 3:
Insert --a-- between "on" and "vehicle"

Signed and Sealed this
Nineteenth Day of March, 2019

Andrei Iancu
*Director of the United States Patent and Trademark Office*